(12) United States Patent
Park

(10) Patent No.: US 11,233,261 B2
(45) Date of Patent: Jan. 25, 2022

(54) FUEL CELL STACK

(71) Applicants: Hyundai Motor Company, Seoul (KR); Kia Motors Corporation, Seoul (KR)

(72) Inventor: Joon Guen Park, Gyeongsangbuk-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 204 days.

(21) Appl. No.: 16/666,670

(22) Filed: Oct. 29, 2019

(65) Prior Publication Data

US 2021/0013532 A1 Jan. 14, 2021

(30) Foreign Application Priority Data

Jul. 12, 2019 (KR) .................. 10-2019-0084670

(51) Int. Cl.
*H01M 8/1006* (2016.01)
*H01M 8/0258* (2016.01)
*H01M 8/023* (2016.01)
*H01M 8/0267* (2016.01)

(52) U.S. Cl.
CPC ......... *H01M 8/1006* (2013.01); *H01M 8/023* (2013.01); *H01M 8/0258* (2013.01); *H01M 8/0267* (2013.01); *H01M 2250/20* (2013.01)

(58) Field of Classification Search
CPC ............. H01M 2250/20; H01M 8/023; H01M 8/0258; H01M 8/0267; H01M 8/1006
See application file for complete search history.

(56) References Cited

U.S. PATENT DOCUMENTS

| | | | |
|---|---|---|---|
| 9,680,165 B2 | 6/2017 | Jin et al. | |
| 10,305,120 B2 | 5/2019 | Jin et al. | |
| 10,355,288 B2 | 7/2019 | Kim et al. | |
| 2008/0233447 A1* | 9/2008 | Gemba | H01M 8/0267 429/433 |
| 2012/0040268 A1* | 2/2012 | Okanishi | H01M 8/2483 429/480 |
| 2015/0303492 A1 | 10/2015 | Jin et al. | |
| 2017/0170491 A1 | 6/2017 | Kim et al. | |
| 2017/0194659 A1 | 7/2017 | Jin et al. | |

FOREIGN PATENT DOCUMENTS

| | | |
|---|---|---|
| KR | 10-1664035 B1 | 10/2016 |
| KR | 10-1724972 B1 | 4/2017 |
| KR | 10-1766098 B1 | 8/2017 |

* cited by examiner

*Primary Examiner* — Adam A Arciero
(74) *Attorney, Agent, or Firm* — Mintz Levin Cohn Ferris Glovsky and Popeo, P.C.; Peter F. Corless

(57) ABSTRACT

A fuel cell stack includes a reaction layer having a MEA, an anode separator having a gas channel formed at a first side facing the reaction layer and through which a first reactant gas flows, and a cooling channel formed at a second side and through which a coolant flows. The anode separator abuts the reaction layer. A cathode separator abuts anode separator so that a first side of the cathode separator covers the cooling channel. A porous structural unit has a partition wall protruding from the second side of the cathode separator and has a flow path for a second reactant gas to minimize a cooling temperature deviation and improve operational efficiency.

17 Claims, 23 Drawing Sheets

FUEL CELL STACK

CROSS-REFERENCE TO RELATED APPLICATIONS

This application claims the priority benefit of Korean Patent Application No. 10-2019-0084670, filed on Jul. 12, 2019, the disclosure of which is incorporated herein by reference.

BACKGROUND

Field of the Invention

The present disclosure relates to a fuel cell stack, and more particularly, to a fuel cell stack that minimizes a cooling temperature deviation and improves operational efficiency.

Description of the Related Art

A fuel cell system refers to a system that continuously produces electrical energy by a chemical reaction of continuously supplied fuel. Research and development are consistently being conducted regarding the fuel cell system as an alternative for solving global environmental issues.

Based on types of electrolytes used for the fuel cell system, the fuel cell system may be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), a direct methanol fuel cell (DMFC), and the like. Based on operating temperatures, output ranges, and the like as well as types of used fuel, the fuel cell systems may be applied to various application fields related to mobile power, transportation, distributed power generation, and the like.

Among the fuel cells, the polymer electrolyte membrane fuel cell is applied to a hydrogen vehicle (hydrogen fuel cell vehicle) being developed to substitute for an internal combustion engine. The hydrogen vehicle is configured to produce own electricity by a chemical reaction between hydrogen and oxygen and to travel by operating a motor. Therefore, the hydrogen vehicle includes a hydrogen tank (H2 Tank) configured to store hydrogen (H2), a fuel cell stack (FC STACK) configured to produce electricity by an oxidation-reduction reaction between hydrogen and oxygen (O2), various types of devices configured to discharge produced water, a battery configured to store electricity produced by the stack, a controller configured to convert and adjust the produced electricity, and a motor configured to generate driving power.

The fuel cell stack refers to a fuel cell main body in which several tens or hundreds of cells are stacked in series, and a unit cell of the fuel cell includes a membrane electrode assembly (MEA) and separators disposed at both sides of the membrane electrode assembly. The separator includes gas flow paths through which hydrogen and air are supplied to the membrane electrode assembly, and cooling flow paths through which a coolant passes.

Meanwhile, recently, to maximize performance of the fuel cell stack, a solution has been proposed for uniformly distributing a surface pressure of the membrane electrode assembly by providing a porous member such as metal foam or wire mesh on the separator (cathode separator) and for facilitating diffusion of reactant gas and improving performance in discharging produced water. However, since it is difficult to manufacture the porous member having a large size corresponding to the unit cell, the multiple divided porous members are individually manufactured. The individually manufactured multiple porous members are disposed to be separated from one another by partition walls that protrude from the separator to prevent overlap of the multiple porous members on the separator.

However, in the related art, since the partition walls, which allow the multiple porous members to be independently disposed, protrude from one side of the separator (e.g., protrude by a pressing process), a cross-sectional area of the cooling flow path is inevitably increased at a portion where the cooling flow paths overlap internal spaces of the partition walls to the extent that the cooling flow path overlaps the internal space of the partition wall. As a result, a substantial amount of coolant flows in the cooling flow paths that do not overlap the internal spaces of the partition walls, which causes a local temperature deviation (e.g., cooling temperature deviation) in the unit cell of the fuel cell. Additionally, the performance and the operational efficiency of the fuel cell stack deteriorate due to the local cooling temperature deviation in the unit cell of the fuel cell.

Therefore, recently, various types of research has been conducted to minimize the cooling temperature deviation caused by the porous member applied to the separator, but the research result is still insufficient. Accordingly, there is a need for development of the fuel cell stack capable of minimizing the cooling temperature deviation.

SUMMARY

An object of the present disclosure is to provide a fuel cell stack capable of minimizing an internal temperature (e.g., cooling temperature) deviation in the fuel cell stack and improving performance and operational efficiency of the fuel cell stack. Another object of the present disclosure is to maintain a uniform flow of a coolant by a cooling channel while applying a porous structural unit to a cathode separator.

Still another object of the present disclosure is to minimize a humidity deviation in an inlet and an outlet of a cathode separator and improve performance and operational efficiency. Yet another object of the present disclosure is to increase humidity in an inlet of a cathode separator without additionally providing a separate humidifier. Still yet another object of the present disclosure is to simplify a structure and a manufacturing process.

In order to achieve the above-mentioned objects, a fuel cell stack according to an exemplary embodiment of the present disclosure may include: a reaction layer having a membrane electrode assembly (MEA); an anode separator having a gas channel formed at a first side facing the reaction layer and configured to allow a first reactant gas to flow therethrough, and a cooling channel formed at a second side and through which a coolant may flow, the anode separator abutting the reaction layer; a flat type cathode separator configured to abut anode separator so that a first side of the flat type cathode separator covers, in a flat manner, the cooling channel; and a porous structural unit having a partition wall protruding from a second side of the cathode separator and having a flow path for a second reactant gas.

This configuration is intended to minimize an internal temperature deviation in the fuel cell stack and to improve performance and operational efficiency. In other words, in the related art, since the partition walls, which allow the multiple porous members to be independently disposed, protrude from one side of the separator, a cross-sectional area of the cooling flow path is inevitably increased at a portion where the cooling flow paths overlap internal spaces of the partition walls to the extent that the cooling flow path overlaps the internal space of the partition wall.

As a result, an increased amount of coolant flows in the cooling flow paths than in other cooling flow paths (e.g., cooling flow paths that do not overlap the internal spaces of the partition walls), which causes a local temperature deviation (e.g., cooling temperature deviation) in the unit cell of the fuel cell. Additionally, the performance and the operational efficiency of the fuel cell stack deteriorate due to the local cooling temperature deviation in the unit cell of the fuel cell.

In contrast, according to the present disclosure, the flat type cathode separator is formed to cover the cooling channel, and the partition wall is provided by the porous structural unit, thereby obtaining an advantageous effect of maintaining the uniform flow of the coolant by the cooling channel while applying the porous structural unit to the cathode separator. Therefore, it may be possible to prevent the coolant from excessively flowing in the particular cooling channel, thereby obtaining an advantageous effect of minimizing a local temperature deviation in the unit cell of the fuel cell and minimizing deterioration in performance and operational efficiency of the fuel cell stack caused by the local cooling temperature deviation in the unit cell of the fuel cell.

In particular, the multiple cooling channels may be formed to be spaced apart from one another, and the multiple cooling channels defined by the cathode separator have cross-sectional areas within the same range. The porous structural unit may have various structures having the partition walls, and the porous structural unit may be disposed to be divided by the partition walls.

As an example, the porous structural unit may include a first porous member provided at a first side of the cathode separator, and a second porous member provided at a second side of the cathode separator and configured to form the partition wall in cooperation with the first porous member. More specifically, the first porous member may include a first support portion supported at the second side of the cathode separator, and a first cantilever slab bent at an end of the first support portion. The second porous member may include a second support portion supported at the second side of the cathode separator, and a second cantilever slab bent at an end of the second support portion As an example, the end of the first cantilever slab and the end of the second cantilever slab may be integrally connected by welding W.

According to another exemplary embodiment of the present disclosure, any one of the first porous member and the second porous member may solely form the partition wall. As an example, the porous structural unit may include a first porous member provided at a first side of the cathode separator and configured to independently form the partition wall, and a second porous member connected to the first porous member.

More specifically, the first porous member may include a first support portion supported at the second side of the cathode separator, a second support portion supported at the second side of the cathode separator and spaced apart from the first support portion; and a slab configured to connect an end of the first support portion and an end of the second support portion. In addition, according to the exemplary embodiment of the present disclosure, an inlet of the cathode separator may be positioned at a lower side and an outlet of the cathode separator may be positioned at an upper side in a gravitational direction, and the partition wall may be disposed in the gravitational direction.

The reason is to increase humidity of the membrane electrode assembly by using the water (produced water) produced by the electrochemical reaction in the fuel cell stack. In other words, the humidity of the electrolyte membrane of the membrane electrode assembly needs to be maintained at a predetermined level so that the fuel cell operates normally. When the humidity of the electrolyte membrane is below the predetermined level, the power generating performance of the fuel cell may deteriorate since the hydrogen positive ions do not smoothly move through the electrolyte membrane.

In particular, the humidity is increased toward an outlet of the cathode since the fuel cell stack produces the water through the electrochemical reaction at the cathode. In contrast, there is a problem in that the humidity is very low in an inlet of the cathode since dry gas (air) is introduced into the inlet. Accordingly, a humidifier for humidifying the air to be supplied into the fuel cell may be provided separately. However, since a space for mounting the humidifier is necessarily provided, a degree of design freedom and the spatial utilization deteriorate and manufacturing costs increase.

Therefore, according to the present disclosure, the cathode separator may be disposed upright vertically in the gravitational direction, and the partition wall of the porous structural unit may be disposed in the gravitational direction, to allow moisture (e.g., produced water) contained in the second reactant gas flowing upward (e.g., toward the outlet of the cathode separator) to flow downward along the partition wall by gravity when the moisture is in contact with the partition wall. As a result, it may be possible to obtain an advantageous effect of increasing the humidity in the inlet of the cathode separator without a separate humidifier. In particular, a first aperture may be formed in any one or both of the first support portion and the second support portion that form the partition wall.

As described above, since the first aperture may be formed in the first support portion (or the second support portion), the second reactant gas containing moisture may be introduced into the partition wall through the first aperture from the outside of the partition wall, thereby obtaining an advantageous effect of improving performance in capturing moisture by the partition wall and rapidly increasing the humidity in the inlet of the cathode separator. In addition, a second aperture may be formed in a close contact surface of the partition wall which is formed by the first cantilever slab and the second cantilever slab and abutting the reaction layer.

Since the second aperture may be formed in the close contact surface of the partition wall, which abuts the reaction layer, as described above, the water formed on the reaction layer may be introduced into the partition wall through the second aperture, thereby obtaining an advantageous effect of further improving the performance in capturing moisture by the partition wall. More particularly, a first rib that extends toward an internal space of the partition wall may be formed on an inner wall surface of the first aperture.

The first rib may be disposed to be inclined as described above, to guide the water captured by the first rib to cause the water to naturally flow downward (e.g., toward the inlet of the cathode) along the first rib, and it may be possible to prevent the water captured by the first rib from being discharged to the outside of the partition wall, thereby obtaining an advantageous effect of increasing the humidity in the inlet of the cathode separator.

As an example, the first rib may be formed by partially cutting and bending a part of the first support portion (or the second support portion), thereby obtaining an advantageous effect of simplifying the process of manufacturing the first rib and the first aperture and reducing costs. In addition, a second rib that extends toward the internal space of the partition wall may be formed on an inner wall surface of the second aperture.

Since the second rib may be formed in the internal space of the partition wall as described above, an area with which the second reactant gas comes into contact in the internal space of the partition wall may be increased, thereby obtaining an advantageous effect of more effectively capturing the moisture contained in the second reactant gas. Furthermore, the water formed on the reaction layer may be introduced into the partition wall along the second rib, thereby obtaining an advantageous effect of further improving the performance in capturing moisture by the partition wall.

As an example, the second rib may be formed by partially cutting and bending a part of the close contact surface of the partition wall. The porous structural unit may include crests and troughs continuously connected to form a waveform, and a crest centerline set in a longitudinal direction of the crest and a trough centerline set in a longitudinal direction of the trough are formed to be inclined with respect to a horizontal line perpendicular to the partition wall.

Since the crest centerline and the trough centerline may be formed to be inclined with respect to the horizontal line perpendicular to the partition wall as described above, the water formed on the crest and the trough may be guided to flow downward by gravity to the partition wall along the crest and the trough, thereby obtaining an advantageous effect of further improving the performance in capturing moisture by the partition wall and minimizing deterioration in humidity in the inlet of the cathode separator.

Particularly, the crest centerline is defined as a line that continuously connects critical points (centers) of the crest in the longitudinal direction of the crest. In addition, the trough centerline is defined as a line that continuously connects critical points of the trough in the longitudinal direction of the trough. As an example, the crest centerline and the trough centerline may be formed to be entirely inclined downward toward the partition wall with respect to the horizontal line.

According to another exemplary embodiment of the present disclosure, the crest centerline and the trough centerline are not entirely inclined, but may be formed with only a partial section adjacent to the partition wall (e.g., an end section of the centerline coupled to the partition wall) inclined downward toward the partition wall with respect to the horizontal line. Each of the crest centerline and the trough centerline may be defined to have any one of a straight shape, a curved shape, and a combination of a straight shape and a curved shape.

According to the present disclosure described above, it may be possible to obtain an advantageous effect of minimizing an internal temperature deviation in the fuel cell stack and improving performance and operational efficiency of the fuel cell stack. In particular, according to the present disclosure, it may be possible to obtain an advantageous effect of maintaining the uniform flow of the coolant as a whole by the cooling channel while applying the porous structural unit to the cathode separator.

In addition, according to the present disclosure, it may be possible to obtain an advantageous effect of minimizing a humidity deviation in the inlet and the outlet of the cathode separator and improving performance and operational efficiency. Furthermore, according to the present disclosure, it may be possible to obtain an advantageous effect of increasing humidity in the inlet of the cathode separator and preventing deterioration in performance caused by deterioration in humidity in the inlet of the cathode separator without additionally providing a separate humidifier. In addition, according to the present disclosure, it may be possible to obtain an advantageous effect of simplifying a structure and a manufacturing process and reducing manufacturing costs.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1:
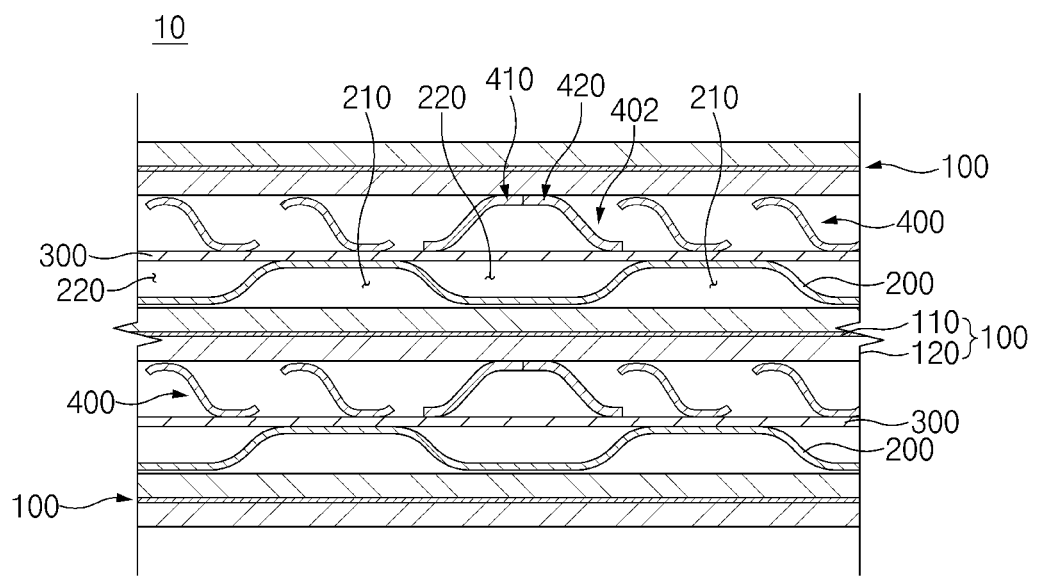
FIG. 1 is a view illustrating a fuel cell stack according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings, but the present disclosure is not restricted or limited by the exemplary embodiments. For reference, like reference numerals denote substantially identical elements in the present description, the description may be made under this rule by incorporating the contents illustrated in other drawings, and the contents repeated or determined as being obvious to those skilled in the art may be omitted.

Referring to FIGS. 1 to 23, a fuel cell stack 10 may include: reaction layers 100 each having a membrane electrode assembly (MEA) 110; anode separators 200 each having gas channels 210 formed at a first side of the anode separator 200 facing the reaction layer 100 and configured to allow a first reactant gas to flow therethrough, and cooling channels 220 formed at a second side of the anode separator 200 and configured to allow a coolant to flow therethrough, the anode separators 200 being in close contact with (e.g., abutting) the reaction layers 100; flat type cathode separators 300 each configured to be in close contact with (e.g., abutting) the anode separator 200 so that a first side of the flat type cathode separator covers, in a flat manner, the cooling channels 220; and porous structural units 400 each having partition walls 402 protruding from a second side of the cathode separator 300 and having flow paths for a second reactant gas.

For reference, the fuel cell stack 10 may include multiple unit cells stacked in a reference direction (vertical direction based on FIG. 1). The reaction layer 100, the anode separator 200, the cathode separator 300, and the porous structural unit 400 form a single unit cell. The reaction layer 100 produces electricity through an oxidation-reduction reaction between fuel (e.g., hydrogen), which is a first reactant gas, and an oxidant (e.g., air) which is a second reactant gas.

As an example, the reaction layer 100 may include the membrane electrode assembly (MEA) 110 configured such that catalyst electrode layers, in which an electrochemical reaction occurs, are attached at both sides of an electrolyte membrane based on the electrolyte membrane in which hydrogen ions move. The reaction layer 100 may further include gas diffusion layers (GDL) being in close contact with (e.g., abutting) both sides of the membrane electrode assembly 110 and configured to uniformly distribute the reactant gases and transmit the produced electrical energy.

For reference, hydrogen, which is fuel, and air, which is the oxidant, are supplied to an anode (not illustrated) and a cathode (not illustrated) of the membrane electrode assembly 110, respectively, through flow paths in the separators (the cathode separator 300 and the anode separator 200), in which hydrogen is supplied to the anode and air is supplied to the cathode. The hydrogen supplied to the anode is decomposed into hydrogen ions (protons) and electrons by catalysts in the electrode layers provided at both sides of the electrolyte membrane. Only the hydrogen ions are selectively delivered to the cathode through the electrolyte membrane, which is a positive ion exchange membrane, and at the same time, the electrons are delivered to the cathode through the gas diffusion layer and the separator which are conductors.

At the cathode, a reaction occurs in which the hydrogen ions supplied through the electrolyte membrane and the electrons supplied through the separator meet oxygen in the air supplied to the cathode by an air supply device to produce water. Due to the movement of the hydrogen ions, the electrons flow through external conductive wires, and an electric current is produced due to the flow of the electrons.

The anode separator 200 and the cathode separator 300 may be configured to supply the reaction layer 100 with the first reactant gas (e.g., hydrogen) and the second reactant gas (e.g., air). The anode separator 200 and the cathode separator 300 are disposed to be in close contact with (e.g., abutting) a first side and a second side of the reaction layer 100, respectively, based on the direction in which the unit cells are stacked. As an example, based on FIG. 1, the anode separator 200 may be disposed at an upper side of the reaction layer 100, and the cathode separator 300 may be disposed at a bottom side of the reaction layer 100.

More specifically, the anode separator 200 may be in close contact with (e.g., abutting) an upper surface of the reaction layer 100. The gas channels 210 through which the first reactant gas flows may be formed at a first side (e.g., bottom side based on FIG. 1) of the anode separator 200 that faces the reaction layer 100, and the cooling channels 220 through which the coolant flows may be formed at a second side (e.g., upper side based on FIG. 1) of the anode separator 200.

As an example, the multiple cooling channels 220 and the multiple gas channels 210 may be disposed at a first side and a second side of the anode separator 200, respectively so that the cooling channels 220 and the gas channels 210 are alternately disposed in one direction (horizontal direction based on FIG. 1). The cooling channels 220 and the gas channels 210 may be variously changed in size and number based on required conditions and design specifications, and the present disclosure is not restricted or limited by the number and the sizes of the cooling channels 220 and the gas channels 210.

Figure 2:
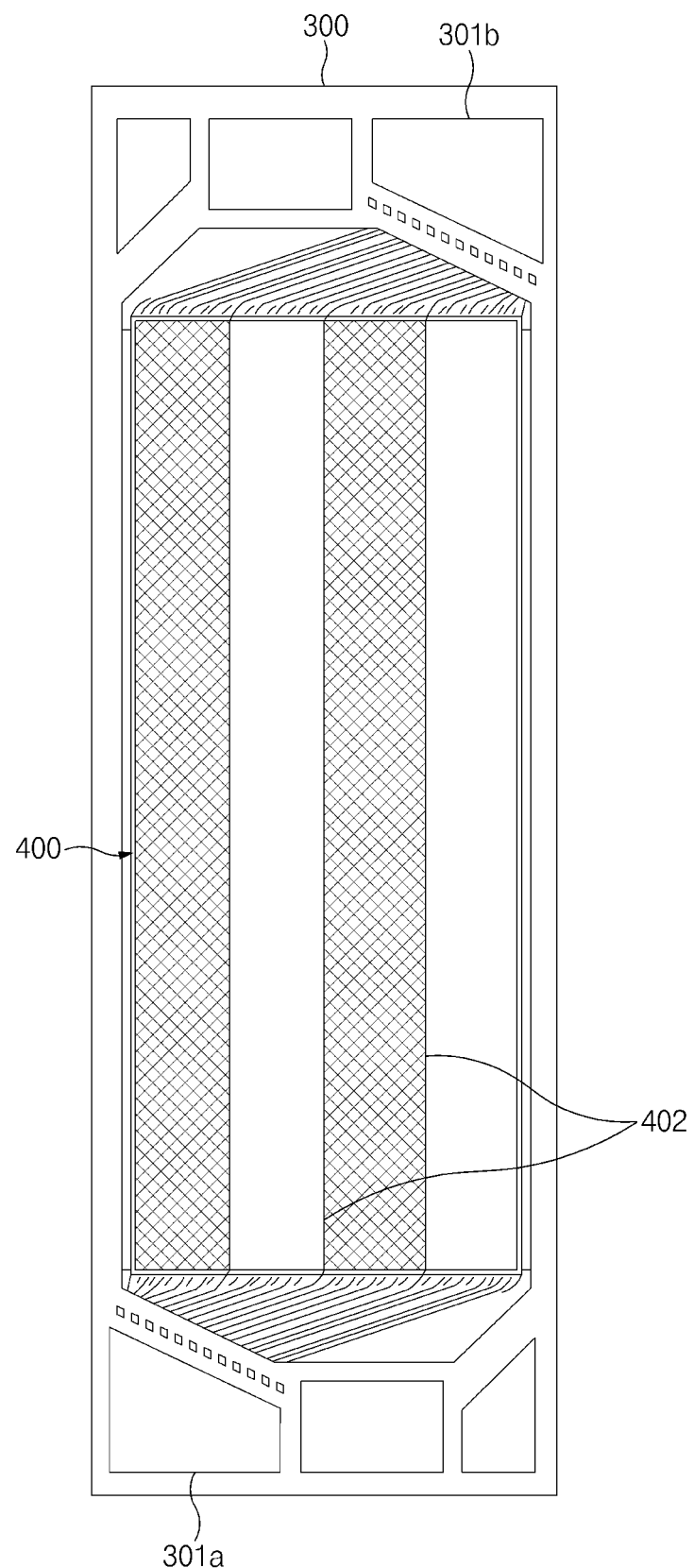
FIG. 2 is a view illustrating a cathode separator in the fuel cell stack according to the present disclosure.

Referring to FIG. 2, the cathode separator 300 may be formed as a flat type separator having no concave-convex portion and disposed to be in close contact with (e.g., abutting) one surface of the anode separator 200 to cover, in a flat manner, the cooling channels 220. An inlet 301a into which the second reactant gas is introduced may be formed at a first end (e.g., lower end based on FIG. 2) of the cathode separator 300, and an outlet 301b from which the second reactant gas and the produced water are discharged may be formed at a second end (e.g., upper end based on FIG. 2) of the cathode separator 300.

The second reactant gas introduced into the inlet 301a of the cathode separator 300 may be supplied to the membrane electrode assembly 110 via an inlet manifold (not illustrated), and the second reactant gas may be discharged, together with the produced water, through the outlet 301b via an outlet manifold (not illustrated) after the electrical energy is produced. As an example, the multiple cooling channels 220 may be formed to be spaced apart from one another, and the multiple cooling channels 220 defined by the cathode separator 300 have cross-sectional areas within the same range.

The porous structural unit 400 may be disposed at the second side of the cathode separator 300 and defines the flow paths for the second reactant gas. More specifically, to uniformly distribute a surface pressure of the membrane electrode assembly 110 and to improve performance in diffusing the second reactant gas and discharging the produced water, the porous structural unit 400 may be disposed between the membrane electrode assembly 110 and the cathode separator 300 and may include partition walls 402 that protrude from the second side of the cathode separator 300.

The porous structural unit 400 may be variously changed in type and material based on required conditions and design specifications. As an example, metal foam, wire mesh, or the like having predetermined porosity may be used as the porous structural unit 400.

Hereinafter, an example in which the porous structural unit 400 is made of metal (e.g., silver, copper, aluminum, tungsten, or a metal alloy) will be described. The porous structural unit 400 may have various structures having the partition walls 402, and the porous structural unit 400 may be disposed to be divided by the partition walls 402.

Figure 3:
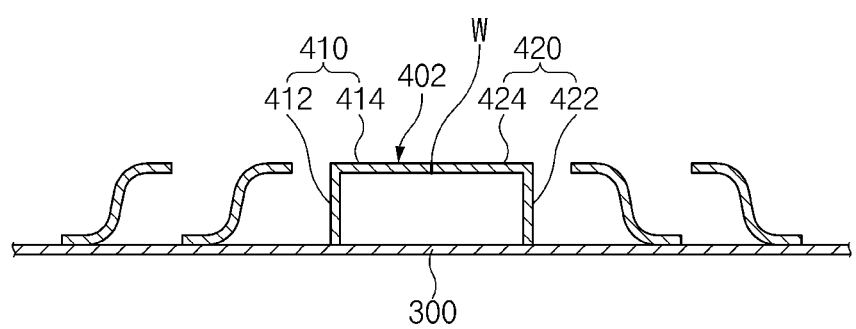
FIG. 3 is a view illustrating a porous structural unit in the fuel cell stack according to the present disclosure.

As an example, referring to FIG. 3, the porous structural unit 400 may include a first porous member 410 disposed at the second side of the cathode separator 300, and a second porous member 420 disposed at the second side of the cathode separator 300 and may form the partition wall 402 in cooperation with the first porous member 410. In particular, the configuration, in which the first porous member 410 and the second porous member 420 cooperatively form the partition wall 402, refers to that a part of the first porous member 410 and a part of the second porous member 420 are connected to each other to form the partition wall 402.

More specifically, the first porous member 410 may include a first support portion 412 supported at the second side (e.g., upper side based on FIG. 3) of the cathode separator 300, and a first cantilever slab 414 bent at an end of the first support portion 412. As an example, the first support portion 412 may be supported to be perpendicular to (or inclined with respect to) the upper side of the cathode separator 300, and the first cantilever slab 414 may be connected, in the form of a cantilevered beam, to the upper end of the first support portion 412.

The second porous member 420 may include a second support portion 422 supported at the second side of the cathode separator 300, and a second cantilever slab 424 bent at an end of the second support portion 422. As an example, the second support portion 422 may be supported to be perpendicular to (or inclined with respect to) the upper side of the cathode separator 300 and spaced apart from the first support portion 412, and the second cantilever slab 424 may be connected, in the form of a cantilevered beam, to the upper end of the second support portion 422.

The partition wall 402 may be formed as an end of the first cantilever slab 414 and an end of the second cantilever slab 424 are integrally connected. As an example, the end of the first cantilever slab 414 and the end of the second cantilever slab 424 may be integrally connected by welding W. A close contact surface of the partition wall 402 (i.e., an upper surface (402*a* in FIG. 10) of the partition wall based on FIG. 3), which is formed as the first cantilever slab 414 and the second cantilever slab 424 are connected, may be in close contact with (e.g., abutting contact) the reaction layer 100, and the porous structural unit 400 may be divided based on the partition wall 402.

In the exemplary embodiment of the present disclosure as described above, the example in which the first porous member 410 and the second porous member 420 cooperatively form the partition wall 402 is described. However, according to another exemplary embodiment of the present disclosure, any one of the first porous member and the second porous member may solely form the partition wall.

Figure 4:
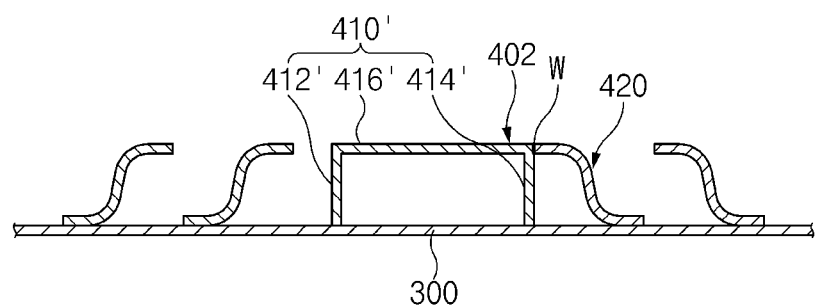
FIG. 4 is a view illustrating another exemplary embodiment of the porous structural unit in the fuel cell stack according to the present disclosure.
Figure 5:
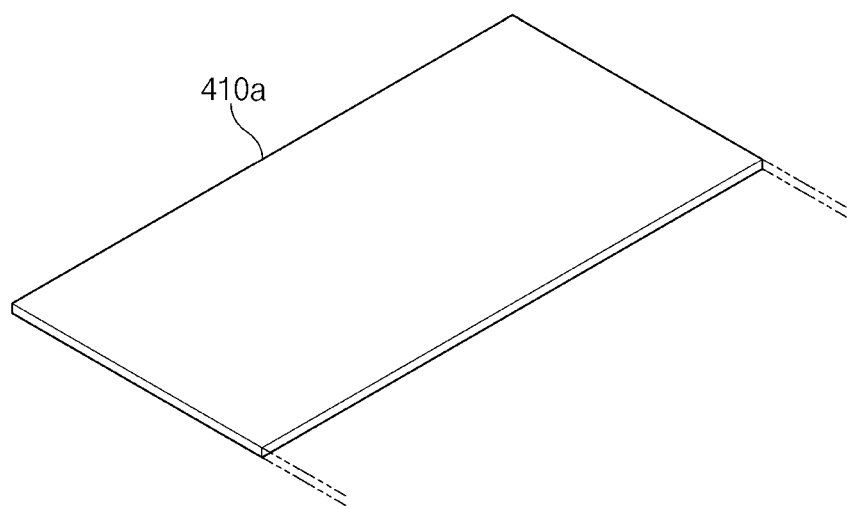
FIGS. 5 to 9 are views illustrating a process of manufacturing the porous structural unit in the fuel cell stack according to the present disclosure.
Figure 6:
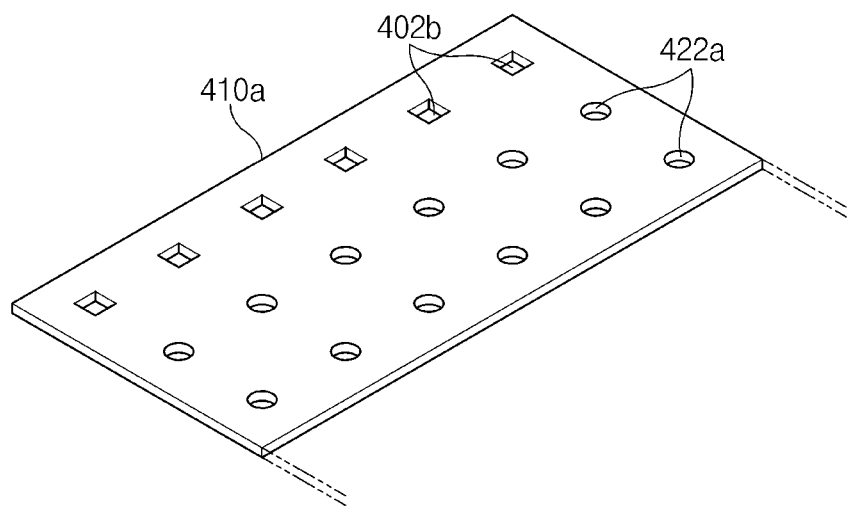
Figure 7:
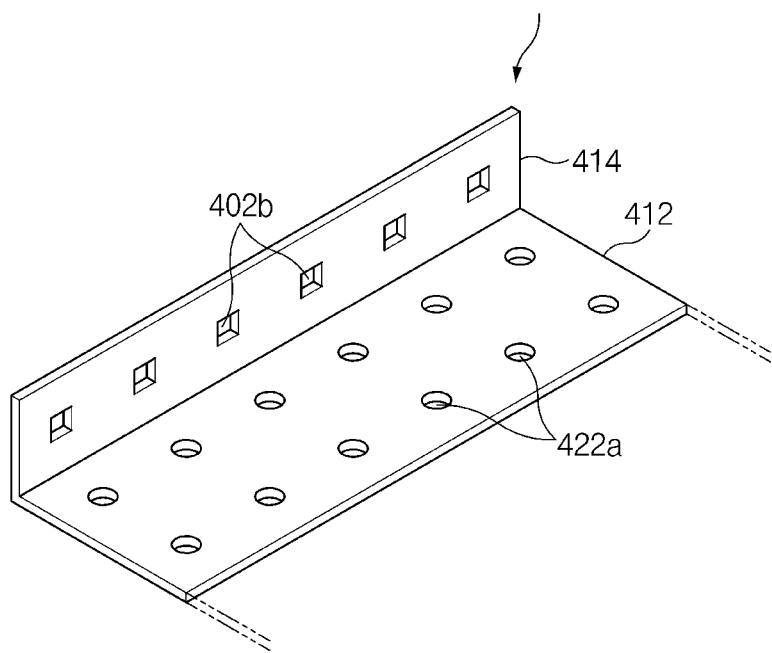

Referring to FIG. 4, the porous structural unit 400 may include a first porous member 410' disposed at the second side of the cathode separator 300 and configured to independently form the partition wall 402, and a second porous member 420 connected to the first porous member 410. More specifically, the first porous member 410' may include a first support portion 412' supported at the second side (e.g., upper side based on FIG. 4) of the cathode separator 300, a second support portion 414' supported at the second side of the cathode separator 300 and spaced apart from the first support portion 412', and a slab 416' configured to connect an end of the first support portion 412' and an end of the second support portion 414', and the partition wall 402 may be formed in an approximate U shape including the first support portion 412', the second support portion 414', and the slab 416'.

Further, the second porous member 420 may be connected, by welding W, to the first porous member 410' (e.g., the end of the second support portion). Since the flat type cathode separator 300 may be formed as described above, the multiple cooling channels 220 defined by the cathode separator 300 have the cross-sectional areas within the same range. In particular, the configuration, in which the multiple cooling channels 220 have the cross-sectional areas having the same range, refers to that the flow rates of the coolant flowing through the multiple cooling channels 220 are within the same range.

In the related art, since the partition walls 402 for dividing and disposing the multiple porous members protrude from a first side of the separator, a cross-sectional area of the cooling flow path is inevitably increased at a portion where the cooling flow path overlaps the internal space of the partition wall 402 to the extent that the cooling flow path overlaps the internal space of the partition wall 402. As a result, an increased amount of coolant flows in the cooling flow path than in other cooling flow paths (e.g., cooling flow paths that do not overlap the internal space of the partition wall 402), which causes a local temperature deviation (e.g., cooling temperature deviation) in the unit cell of the fuel cell. Additionally, the performance and the operational efficiency of the fuel cell stack 10 deteriorate due to the local cooling temperature deviation in the unit cell of the fuel cell.

However, according to the present disclosure, the flat type cathode separator 300 may be formed to cover the cooling channels 220, and the multiple porous structural units 400 may be disposed to be divided by the partition walls 402 integrally disposed on the porous structural units 400, thereby obtaining an advantageous effect of maintaining the uniform flow of the coolant as a whole by means of the cooling channels 220 while applying the porous structural unit 400 to the cathode separator 300.

Therefore, it may be possible to prevent the coolant from excessively flowing in the particular cooling channel 220, thereby obtaining an advantageous effect of minimizing a local temperature deviation in the unit cell of the fuel cell and minimizing deterioration in performance and operational efficiency of the fuel cell stack 10 caused by the local cooling temperature deviation in the unit cell of the fuel cell.

Meanwhile, the porous structural unit 400 according to the present disclosure may be manufactured by various methods based on required conditions and design specifications. As an example, referring to FIGS. 5 to 9, the first porous member 410, of the porous structural unit 400, may be manufactured by performing blanking processing on (e.g., forming holes in) a metal plate (410*a* in FIG. 5) to form a porous body (see FIG. 6), and then bending a part of the metal plate 410*a* to form the first support portion 412 and the first cantilever slab 414 (see FIG. 7). For reference, first apertures 422a and second apertures 402b, which will be described below, may also be formed when the blanking processing is performed on the metal plate 410a.

Figure 8:
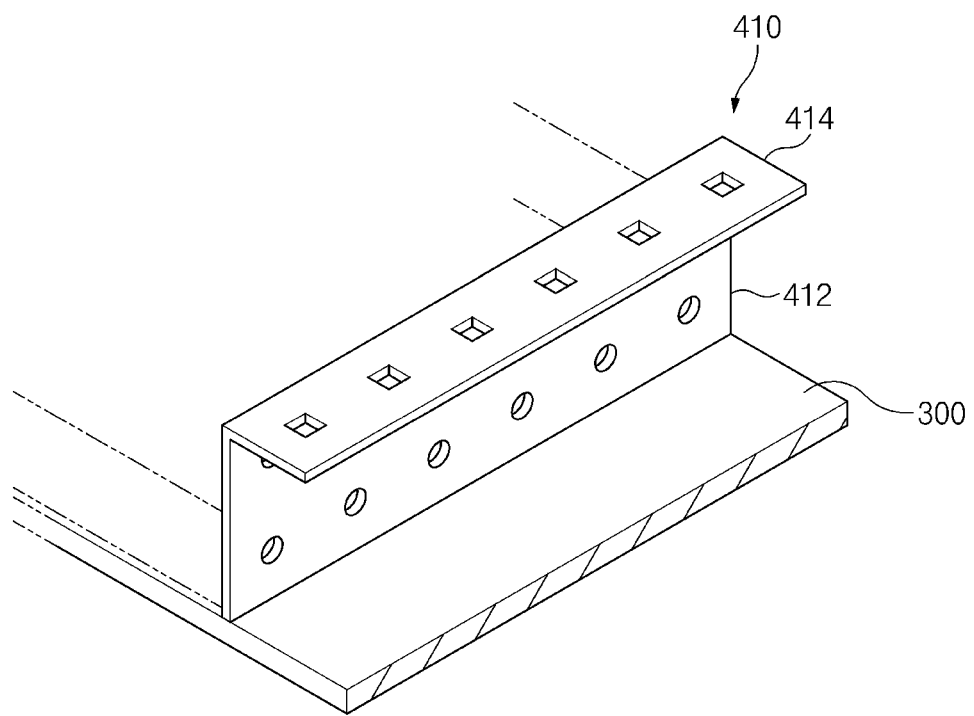
Figure 9:
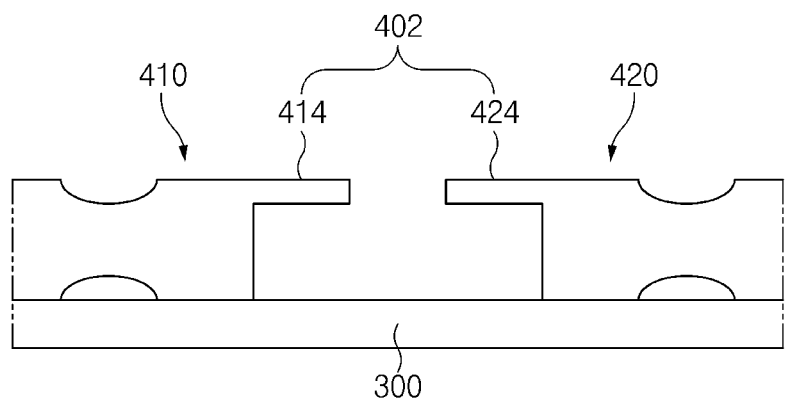

Referring to FIG. 8, the first support portion 412 of the first porous member 410 may be supported on the cathode separator 300, and the first cantilever slab 414 may be disposed in the form of a cantilevered beam spaced apart from the cathode separator 300. Similar to the first porous member 410, the second porous member 420 may also be formed by processing a metal plate. As illustrated in FIG. 9, the partition wall 402 may be formed by disposing the first cantilever slab 414 of the first porous member 410 and the second cantilever slab 424 of the second porous member 420 so that the first cantilever slab 414 and the second cantilever slab 424 face each other, and then by connecting (e.g., by welding) the first cantilever slab 414 and the second cantilever slab 424.

In addition, according to the exemplary embodiment of the present disclosure, the inlet of the cathode separator 300 may be positioned at the lower side and the outlet of the cathode separator 300 may be positioned at the upper side based on the gravitational direction G, and the partition wall 402 may be disposed in the gravitational direction G to increase humidity of the membrane electrode assembly 110 using the water (produced water) produced by the electrochemical reaction in the fuel cell stack 10.

In other words, the humidity of the electrolyte membrane of the membrane electrode assembly 110 needs to be maintained at a predetermined level so that the fuel cell operates normally. When the humidity of the electrolyte membrane is below the predetermined level, the power generating performance of the fuel cell may deteriorate since the hydrogen positive ions do not smoothly move through the electrolyte membrane (so called, a dry-out phenomenon). In particular, the humidity is increased toward an outlet of the cathode since the fuel cell stack 10 produces the water through the electrochemical reaction at the cathode. In contrast, the humidity is very low in an inlet of the cathode since dry gas (air) is introduced into the inlet.

Accordingly, a humidifier configured to humidify the air to be supplied into the fuel cell may be provided separately. However, since a space for mounting the humidifier is necessarily provided, a degree of design freedom and the spatial utilization deteriorate and manufacturing costs are increased. Therefore, according to the present disclosure, the cathode separator 300 may be disposed upright vertically in the gravitational direction G, and the partition wall 402 of the porous structural unit 400 may be disposed in the gravitational direction G, such that moisture (produced water) contained in the second reactant gas flowing upward (e.g., toward the outlet of the cathode separator 300) may flow downward along the partition wall 402 by gravity in a state in which the moisture is in contact with the partition wall 402. As a result, it may be possible to obtain an advantageous effect of increasing the humidity in the inlet of the cathode separator 300 without a separate humidifier.

Figure 10:
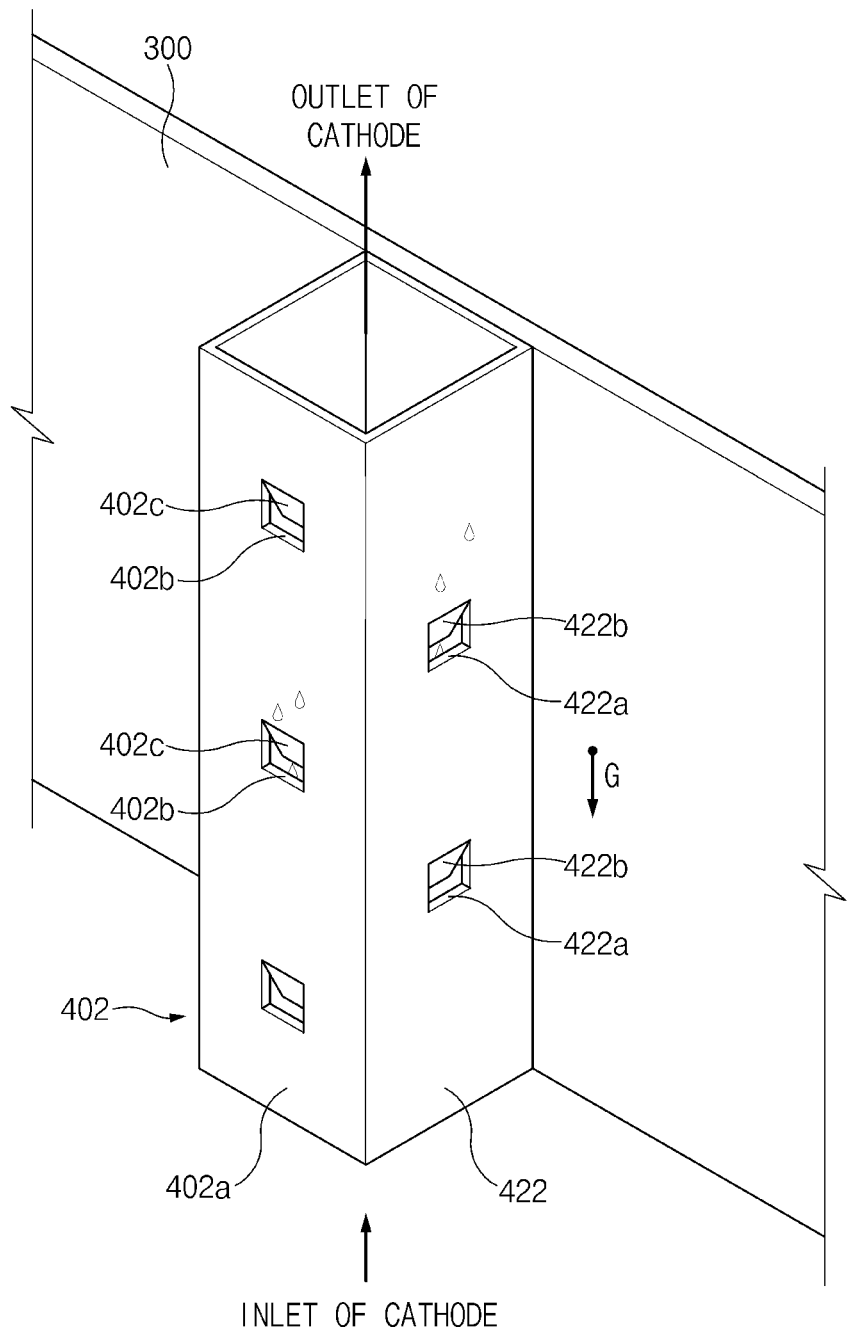
FIGS. 10 and 11 are views illustrating a partition wall of the porous structural unit in the fuel cell stack according to the present disclosure.
Figure 11:
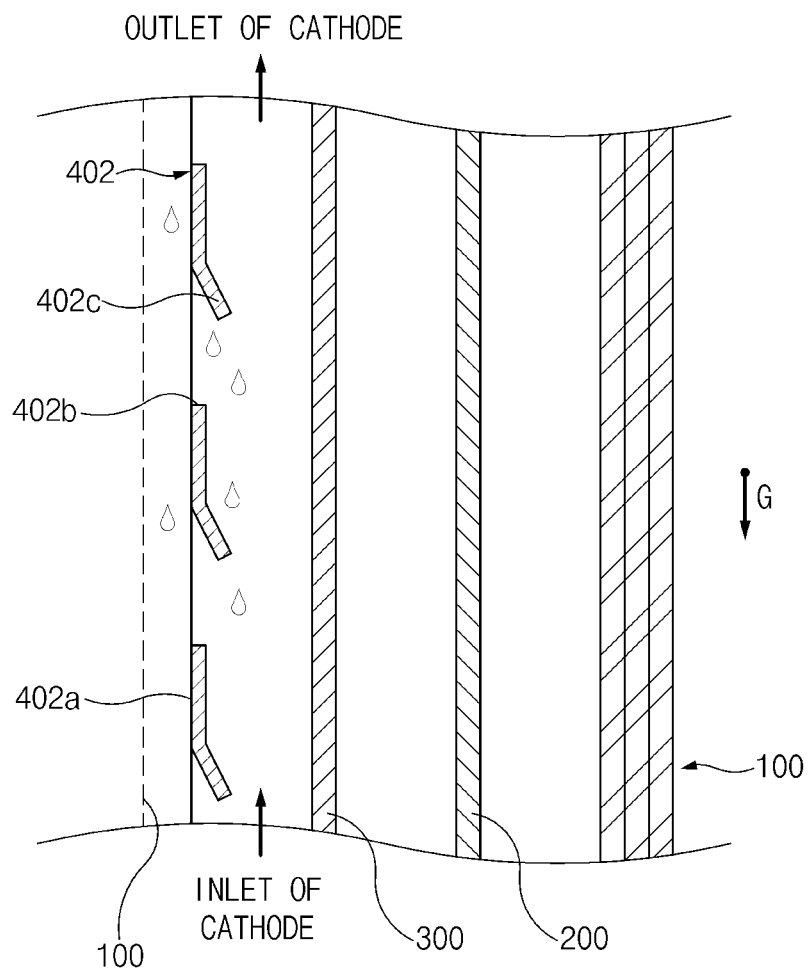

More specifically, referring to FIGS. 10 and 11, the cathode separator 300 may be disposed upright in the gravitational direction (e.g., vertical direction) to position the inlet at the lower side and the outlet at the upper side, and the partition wall 402 of the porous structural unit 400 may be disposed in the gravitational direction G. In particular, the first apertures 422a may be formed in any one or both of the first support portion 412 and the second support portion 422 that form the partition wall 402.

As an example, the first aperture 422a having a quadrangular shape may be formed in the second support portion 422. According to another exemplary embodiment of the present disclosure, the first aperture may be formed in the first support portion, or the first apertures may be formed in the first support portion and the second support portion.

As described above, since the first aperture 422a may be formed in the first support portion 412 (or the second support portion), the second reactant gas containing moisture may be introduced into the partition wall 402 through the first aperture 422a from the outside of the partition wall 402, thereby obtaining an advantageous effect of improving performance in capturing moisture by the partition wall 402 and rapidly increasing the humidity in the inlet of the cathode separator 300.

In addition, second apertures 402b each having a quadrangular shape may be formed in the close contact surface 402a of the partition wall 402 which is formed by the first cantilever slab 414 and the second cantilever slab 424 and is in close contact with (e.g., abutting) the reaction layer 100 (e.g., the gas diffusion layer). Since the second aperture 402b may be formed in the close contact surface 402a of the partition wall 402, which is in close contact with the reaction layer, as described above, the water formed on the reaction layer 100 may be introduced into the partition wall 402 through the second aperture 402b, thereby obtaining an advantageous effect of further improving the performance in capturing moisture by the partition wall 402.

More particularly, a first rib 422b having a quadrangular shape and extending toward the internal space of the partition wall 402 may be formed on an inner wall surface of the first aperture 422a. The first rib 422b extends from the inner wall surface of the first aperture 422a and may be disposed in the internal space of the partition wall 402. Since the first rib 422b may be formed in the internal space of the partition wall 402 as described above, an area with which the second reactant gas comes into contact in the internal space of the partition wall 402 may be increased, thereby obtaining an advantageous effect of more effectively capturing the moisture contained in the second reactant gas.

In particular, the first rib 422b may be disposed in the internal space of the partition wall 402 to be inclined downward toward the inlet of the cathode. Since the first rib 422b may be disposed to be inclined as described above, the first rib 422b may guide the water captured by the first rib 422b to cause the water to naturally flow downward (e.g., toward the inlet of the cathode) along the first rib 422b, and the first rib 422b may prevent the water captured by the first rib 422b from being discharged to the outside of the partition wall 402, thereby obtaining an advantageous effect of increasing the humidity in the inlet of the cathode separator 300.

The first rib 422b may be formed by various methods based on required conditions and design specifications. As an example, the first rib 422b may be formed by partially cutting and bending a part of the first support portion 412 (or the second support portion) through a typical lancing processing method or the like. Further, the first aperture 422a may also be formed in the first support portion 412 as the first rib 422b is formed by partially cutting and bending a part of the first support portion 412. The first rib 422b may be formed by cutting and bending a part of the first support portion 412 as described above, thereby obtaining an advantageous effect of simplifying the process of manufacturing the first rib 422b and the first aperture 422a and reducing costs.

According to another exemplary embodiment of the present disclosure, the first rib may be mounted by a separate process after the first aperture is formed in the first support portion. In addition, a second rib 402c having a quadrangular shape and extending toward the internal space of the partition wall 402 may be formed on an inner wall surface of the second aperture 402b.

The second rib 402c extends from the inner wall surface of the second aperture 402b and may be disposed in the internal space of the partition wall 402. Since the second rib 402c may be formed in the internal space of the partition wall 402 as described above, an area with which the second reactant gas comes into contact in the internal space of the partition wall 402 may be increased, thereby obtaining an advantageous effect of more effectively capturing the moisture contained in the second reactant gas. Furthermore, the water formed on the reaction layer 100 may be introduced into the partition wall 402 along the second rib 402c, thereby obtaining an advantageous effect of further improving the performance in capturing moisture by the partition wall 402.

In particular, the second rib 402c may be disposed in the internal space of the partition wall 402 to be inclined downward toward the inlet of the cathode. Since the second rib 402c may be disposed to be inclined as described above, the second rib 402c may guide the water captured by the second rib 402c to cause the water to naturally flow downward (e.g., toward the inlet of the cathode) along the second rib 402c, and the second rib 402c may prevent the water captured by the second rib 402c from being discharged to the outside of the partition wall 402, thereby obtaining an advantageous effect of more effectively increasing the humidity in the inlet of the cathode separator 300.

The second rib 402c may be formed by various methods based on required conditions and design specifications. As an example, the second rib 402c may be formed by partially cutting and bending a part of the close contact surface 402a of the partition wall 402 through a typical lancing processing method or the like. Further, the second aperture 402b may also be formed in the second support portion 422 as the second rib 402c is formed by partially cutting and bending a part of the close contact surface 402a. The second rib 402c may be formed by cutting and bending a part of the close contact surface 402a as described above, thereby obtaining an advantageous effect of simplifying the process of manufacturing the second rib 402c and the second aperture 402b and reducing costs.

According to another exemplary embodiment of the present disclosure, the second rib may be mounted by a separate process after the second aperture is formed in the close contact surface. For reference, a width (e.g., width in the horizontal direction) of the partition wall 402 may be variously changed based on required conditions and design specifications. In particular, the width of the partition wall 402 may be sized not to hinder the flow of the second reactant gas flowing in the region outside the partition wall 402.

In addition, structural rigidity of the partition wall 402 may deteriorate if the first aperture 422a (or the first rib) and the second aperture 402b (or the second rib) have a size equal to or greater than a predetermined size. Therefore, the first aperture 422a (or the first rib) and the second aperture 402b (or the second rib) may be formed to have a width equal to or less than a half of the width of the partition wall 402.

In the exemplary embodiment of the present disclosure described and illustrated above, the example in which the partition wall 402 is provided with all of the first aperture 422a, the first rib 422b, the second aperture 402b, and the second rib 402c is described.

However, according to another exemplary embodiment of the present disclosure, only some of the first aperture 422a, the first rib 422b, the second aperture 402b, and the second rib 402c may be formed, and the first aperture 422a, the first rib 422b, the second aperture 402b, and the second rib 402c may be variously changed in shape and structure based on required conditions and design specifications.

Figure 12:
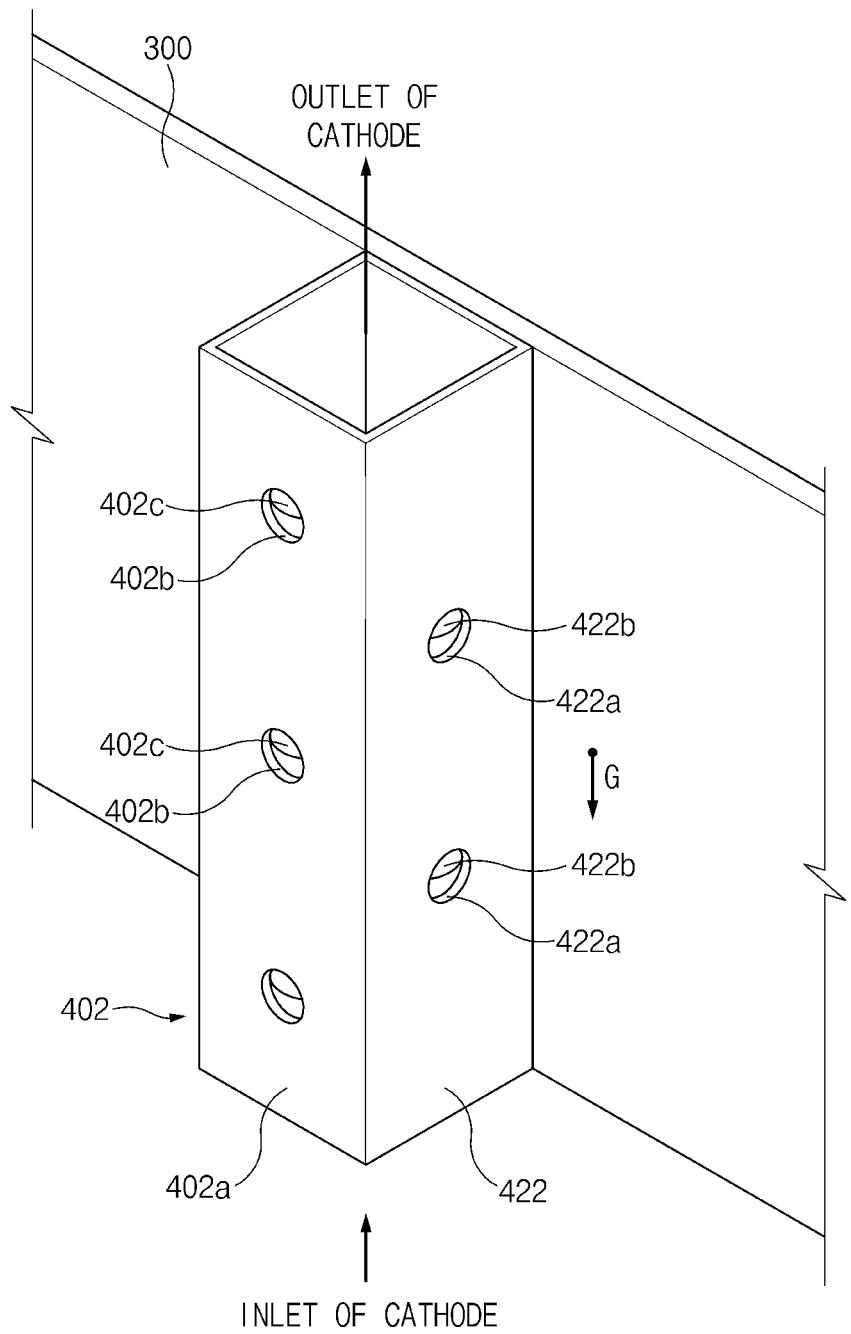
FIGS. 12 to 16 are views illustrating other exemplary embodiments of the partition wall of the porous structural unit in the fuel cell stack according to the present disclosure.
Figure 13:
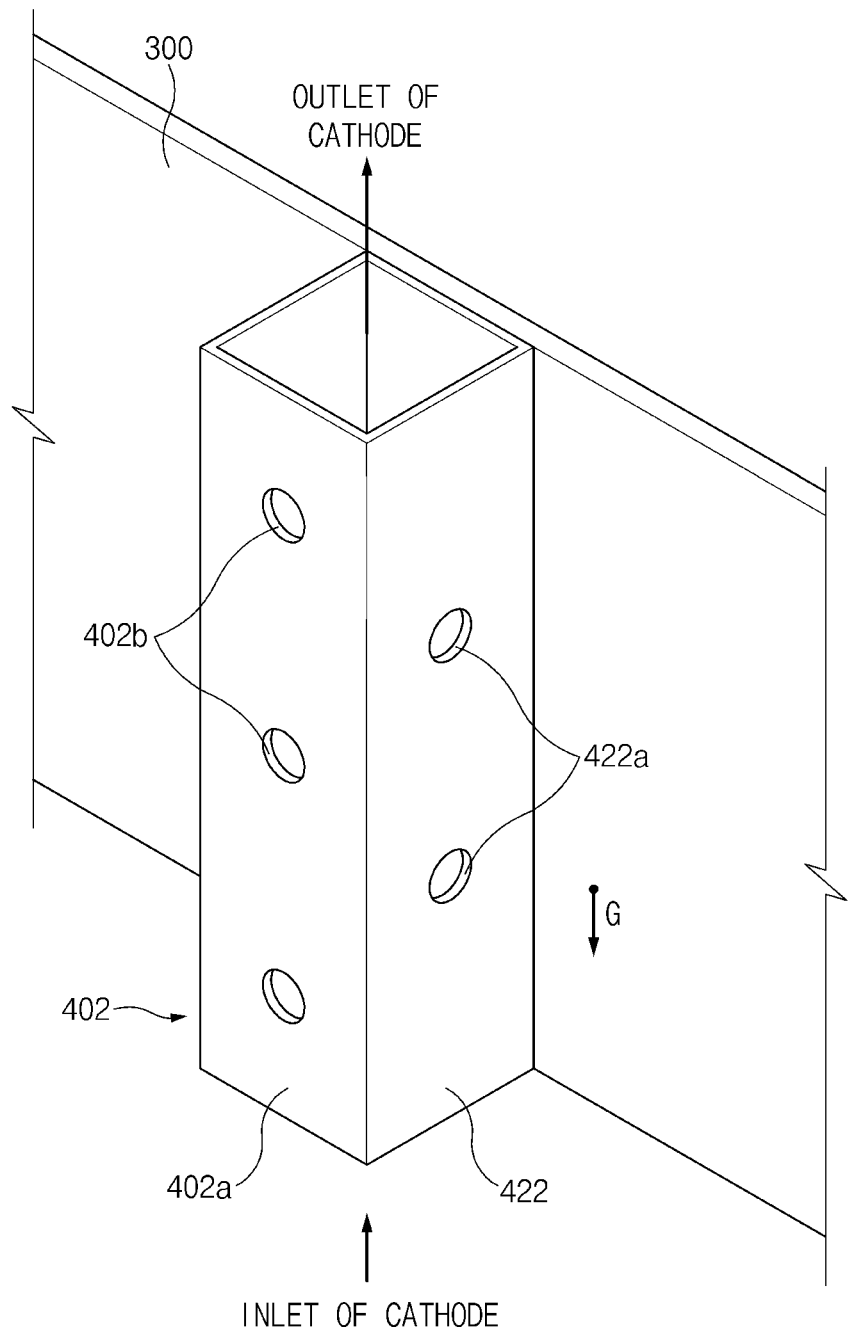

As an example, referring to FIG. 12, each of the first aperture 422a, the first rib 422b, the second aperture 402b, and the second rib 402c may be formed in a circular shape. Alternatively, each of the first aperture 422a, the first rib 422b, the second aperture 402b, and the second rib 402c may be formed in an elliptical shape or other polygonal shapes. As another example, referring to FIG. 13, the first rib 422b and the second rib 402c may not be formed in the partition wall 402, but only the first aperture 422a having a circular shape and the second aperture 402b having a circular shape may be formed.

Figure 14:
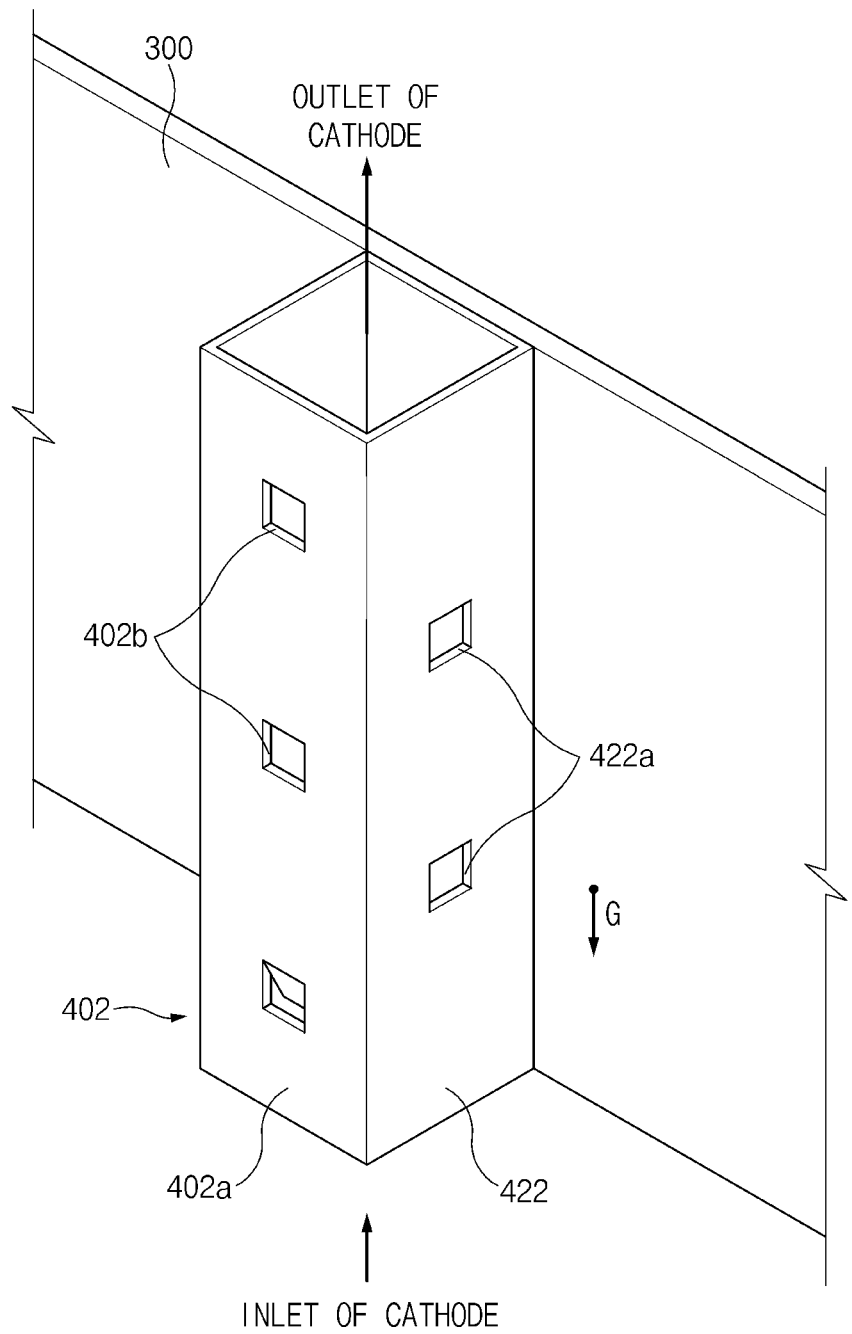
Figure 15:
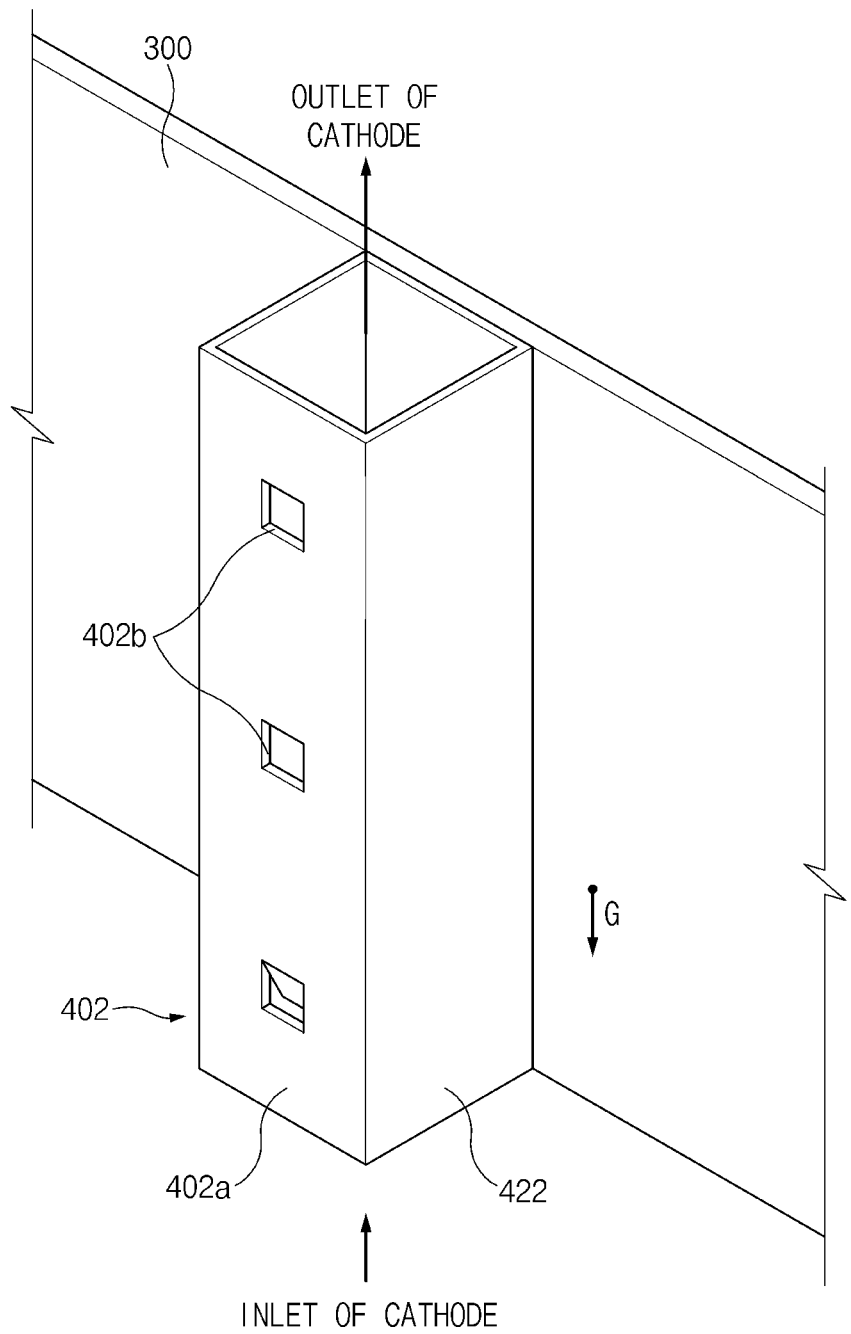
Figure 16:
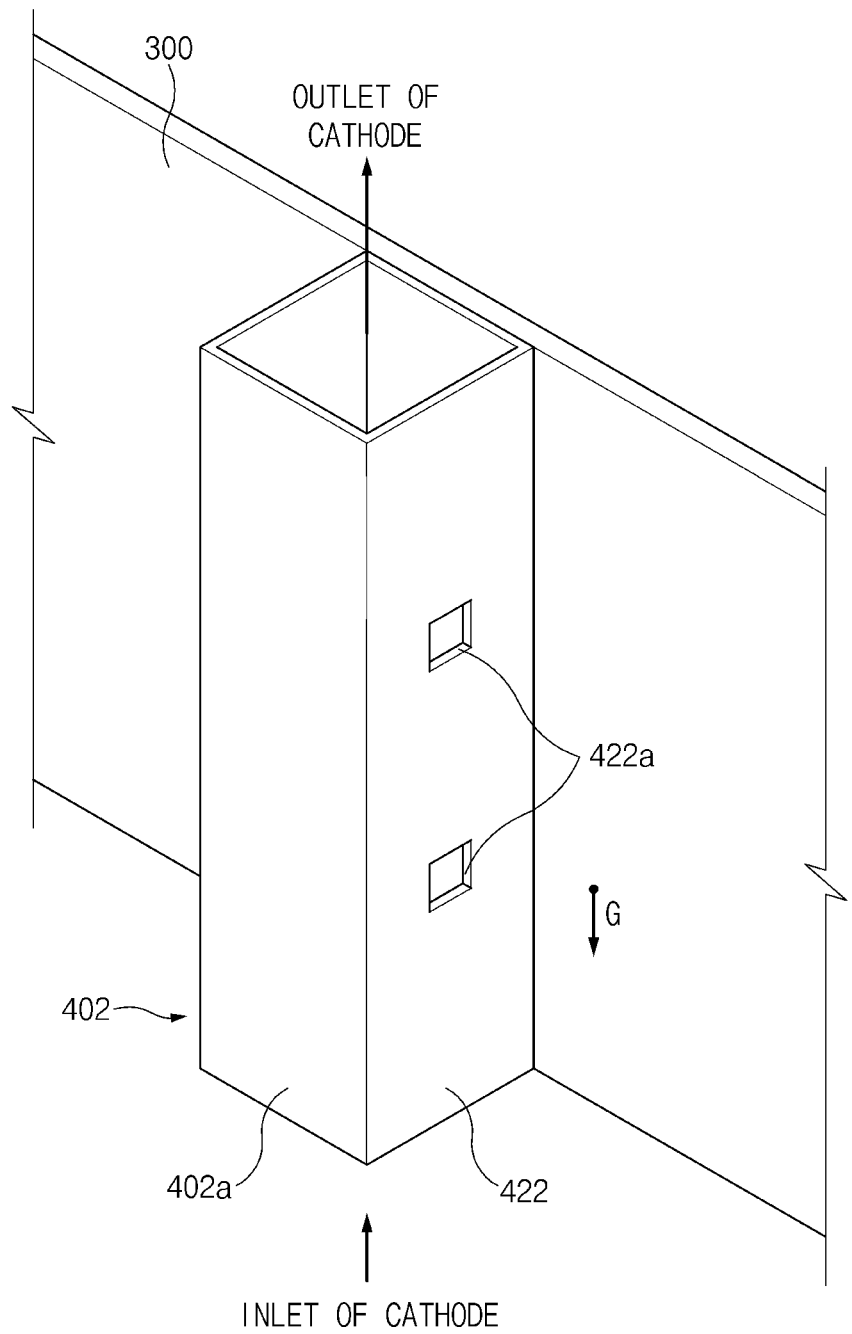

As still another example, referring to FIG. 14, the first rib 422b and the second rib 402c may not be formed in the partition wall 402, but only the first aperture 422a having a quadrangular shape and the second aperture 402b having a quadrangular shape may be formed. As yet another an example, referring to FIG. 15, the first rib 422b, the second rib 402c, and the first aperture 422a may not be formed in the partition wall 402, but only the second aperture 402b having a quadrangular or circular shape may be formed. As still yet another example, referring to FIG. 16, the first rib 422b, the second rib 402c, and the second aperture 402b may not be formed in the partition wall 402, but only the first aperture 422a having a quadrangular or circular shape may be formed.

Figure 17:
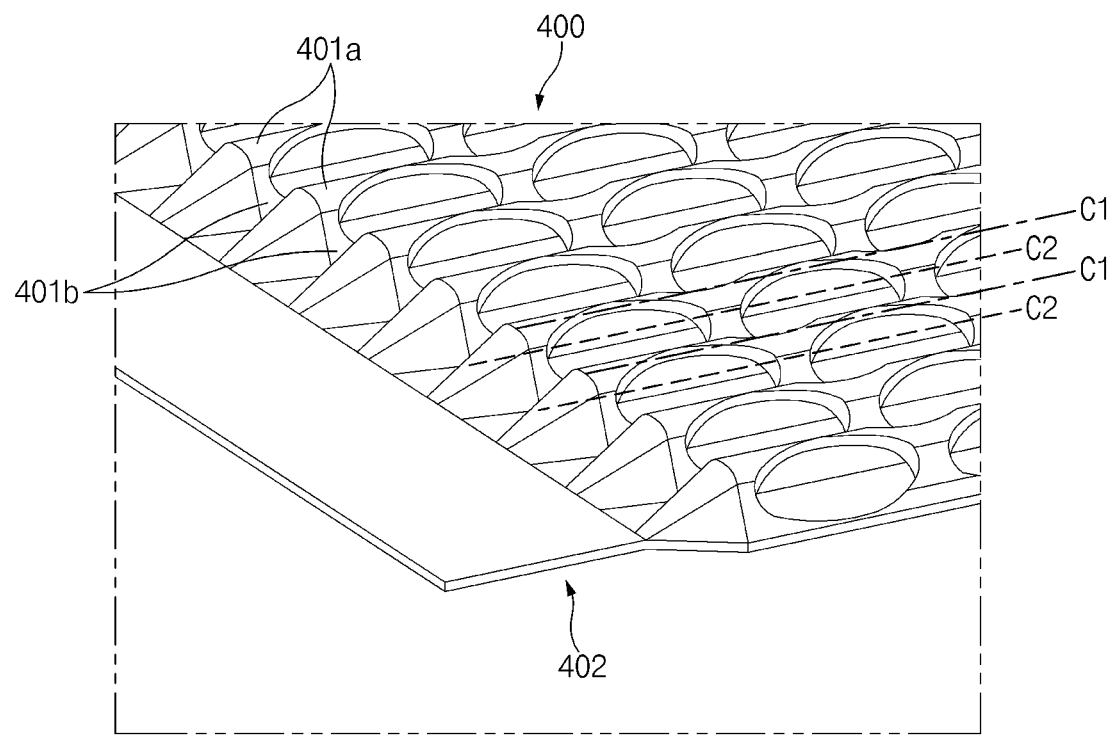
FIGS. 17 and 18 are views illustrating troughs and crests of the porous structural unit in the fuel cell stack according to the present disclosure.
Figure 18:
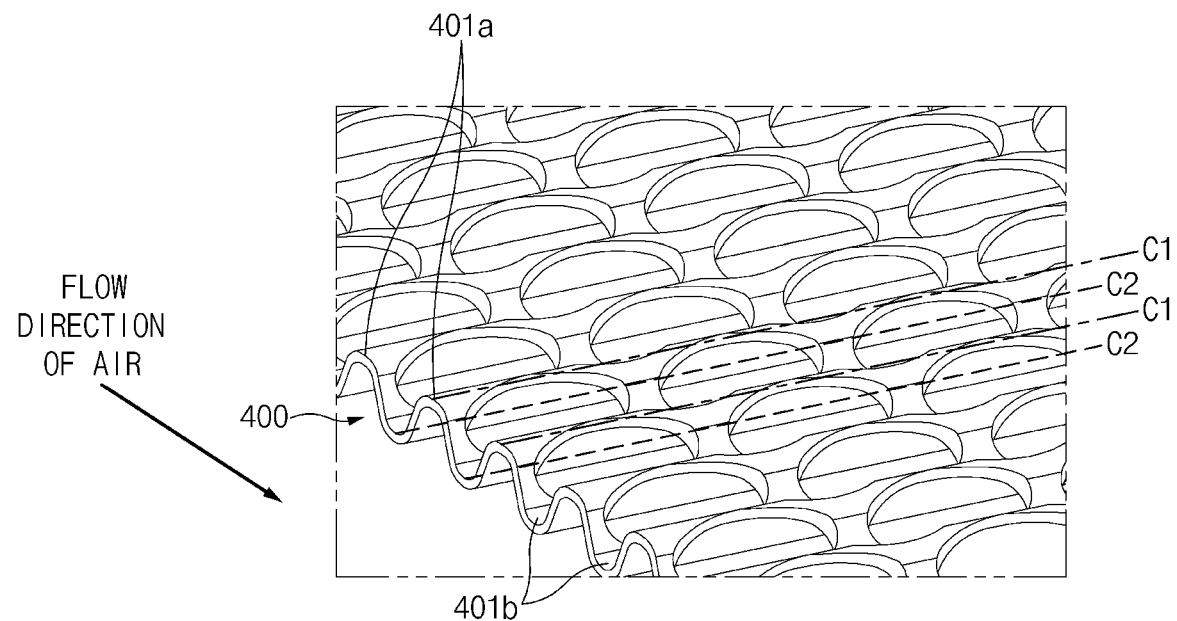

Meanwhile, referring to FIGS. 17 and 18, the porous structural unit 400 may include crests 401a and troughs 401b connected continuously to form a waveform. More specifically, the crests 401a and the troughs 401b of the porous structural unit 400 may be disposed alternately in the flow direction of air (e.g., second reactant gas) to form a continuous waveform.

Further, a height of the crest 401a, a height of the trough 401b, a spacing interval between the crests 401a may appropriately vary based on required conditions and design specifications, and the present disclosure is not restricted or limited by the sizes and the structures of the crest 401a and the trough 401b. The crest 401a or the trough 401b may be formed as a porous body having multiple apertures (not illustrated), and the aperture of the crest 401a or the trough 401b may also be formed when the blanking processing is performed on the metal plate (see FIG. 6).

In particular, a crest centerline C1 set in a longitudinal direction of the of the crest 401a and a trough centerline C2 set in a longitudinal direction of the trough 401b may be formed to be inclined with reference to a horizontal line perpendicular to the partition wall 402. Since the crest centerline C1 and the trough centerline C2 may be formed to be inclined with respect to the horizontal line perpendicular to the partition wall 402 as described above, the water formed on the crest 401a and the trough 401b may be guided to flow downward by gravity to the partition wall 402 along the crest 401a and the trough 401b, thereby obtaining an advantageous effect of further improving the performance in capturing moisture by means of the partition wall 402 and minimizing deterioration in humidity in the inlet of the cathode separator 300.

Particularly, the crest centerline C1 is defined as a line that continuously connects critical points (centers) of the crest 401a in the longitudinal direction of the crest 401a. In addition, the trough centerline C2 is defined as a line that continuously connects critical points of the trough 401b in the longitudinal direction of the trough 401b. As an example, the crest centerline C1 and the trough centerline C2 may be formed to be entirely inclined downward toward the partition wall 402 with respect to the horizontal line.

According to another exemplary embodiment of the present disclosure, the crest centerline C1 and the trough centerline C2 are not entirely inclined, but only a partial section adjacent to the partition wall 402 (e.g., an end section of the centerline coupled to the partition wall) may be inclined downward toward the partition wall 402 with respect to the horizontal line. For reference, each of the crest centerline C1 and the trough centerline C2 may defined to have any one of a straight shape, a curved shape, and a combination of a straight shape and a curved shape, but the present disclosure is not restricted or limited by the shapes and the structures of the crest centerline C1 and the trough centerline C2.

More specifically, referring to FIGS. 19 to 23, the porous structural unit 400 may include the multiple partition walls 402 formed in the gravitational direction G, and the crest centerlines C1 and the trough centerlines C2 of the crests 401a and the troughs 401b positioned at the periphery of the partition walls 402 may be formed to be entirely or partially inclined downward toward the partition walls 402.

Figure 19:
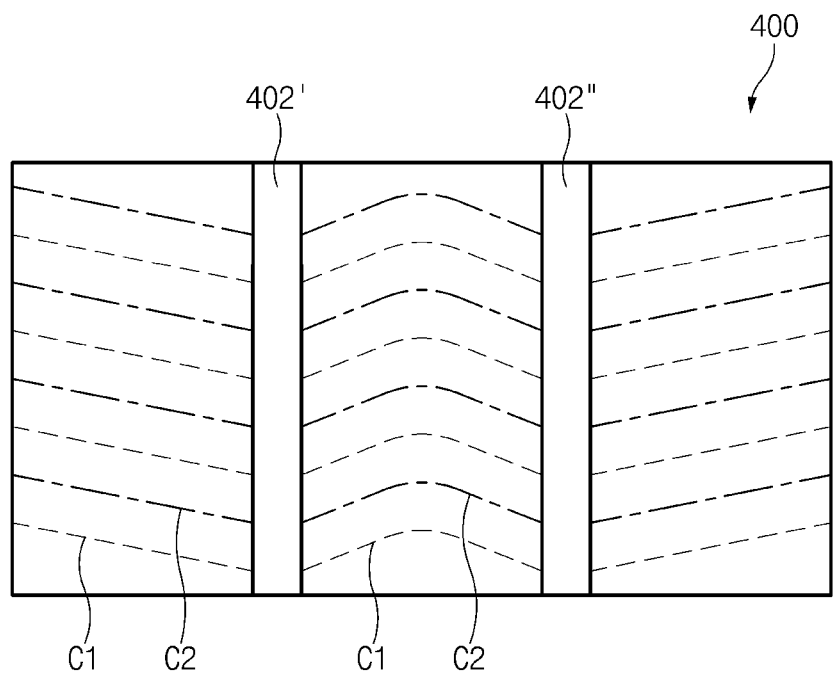
FIGS. 19 to 23 are views illustrating other exemplary embodiments of the troughs and the crests of the porous structural unit in the fuel cell stack according to the present disclosure.

As an example, referring to FIG. 19, the porous structural unit 400 may include a first partition wall 402' formed in the gravitational direction G, and a second partition wall 402" formed in the gravitational direction G and disposed to be spaced apart from the first partition wall 402'. Based on FIG. 19, the crest centerline C1 and the trough centerline C2 of the crest 401a and the trough 401b disposed at the left side of the first partition wall 402' may be formed to be inclined downward toward the first partition wall 402', the crest centerline C1 and the trough centerline C2 of the crest 401a and the trough 401b disposed at the right side of the second partition wall 402" may be formed to be inclined downward toward the second partition wall 402. The crest centerline C1 and the trough centerline C2 of the crest 401a and the trough 401b positioned between the first partition wall 402' and the second partition wall 402" may be bent in an approximately V shape and formed to be inclined downward toward the first partition wall 402' and the second partition wall 402". Therefore, the water formed on the crest 401a and the trough 401b may flow downward by gravity along the crest 401a and the trough 401b and may be guided to the first partition wall 402' and the second partition wall 402".

Figure 20:
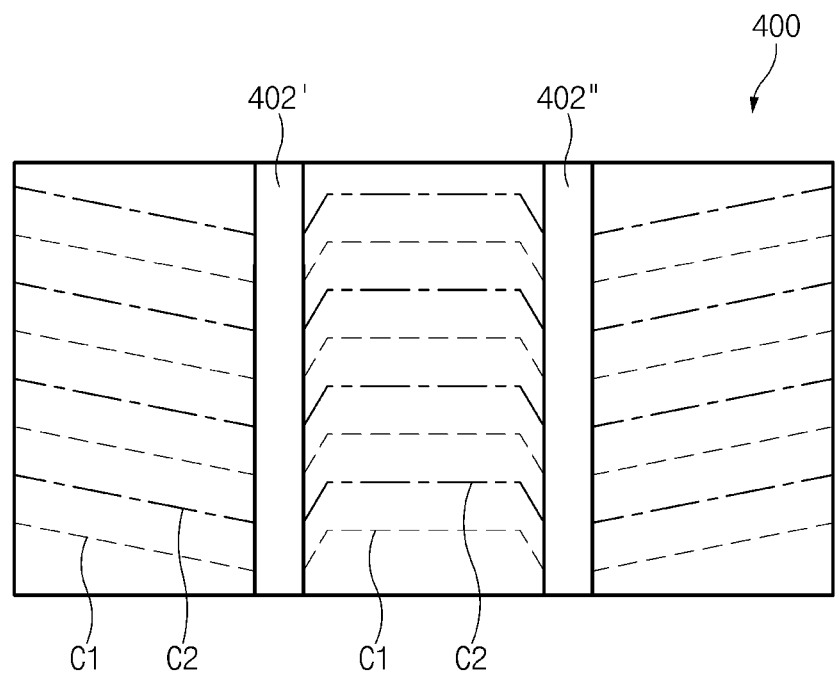

As another example, referring to FIG. 20, the porous structural unit 400 may include the first partition wall 402' formed in the gravitational direction G, and the second partition wall 402" formed in the gravitational direction G and disposed to be spaced apart from the first partition wall 402'. Based on FIG. 20, the crest centerline C1 and the trough centerline C2 of the crest 401a and the trough 401b disposed at the left side of the first partition wall 402' may be formed to be inclined downward toward the first partition wall 402'. The crest centerline C1 and the trough centerline C2 of the crest 401a and the trough 401b disposed at the right side of the second partition wall 402" may be formed to be inclined downward toward the second partition wall 402". The crest centerline C1 and the trough centerline C2 of the crest 401a and the trough 401b positioned between the first partition wall 402' and the second partition wall 402" may be formed in an approximately trapezoidal shape having a combination of a straight section (central portion) parallel to the horizontal line and inclined sections (both ends) disposed to be inclined downward toward the first partition wall 402' and the second partition wall 402".

Figure 21:
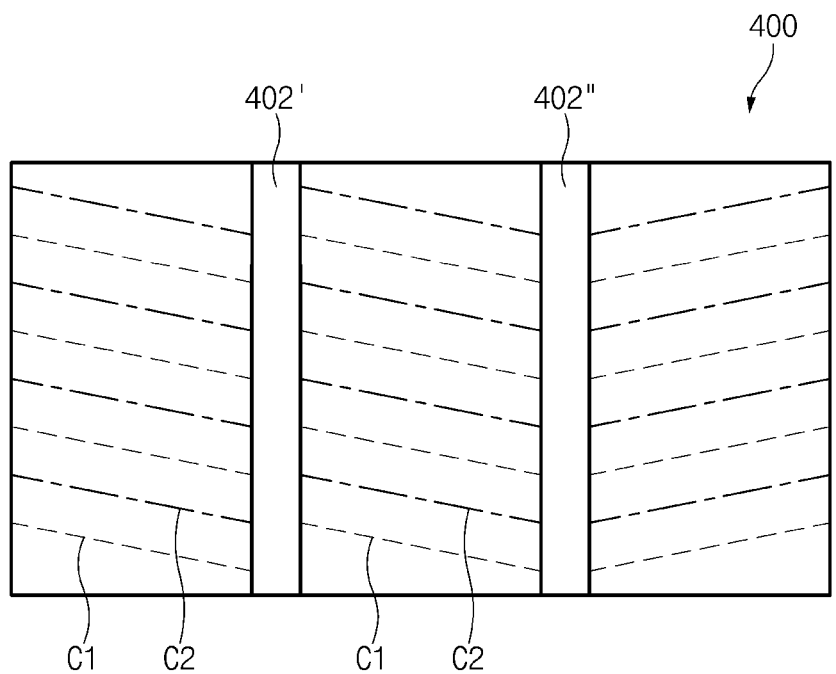

As still another example, referring to FIG. 21, the porous structural unit 400 may include the first partition wall 402' formed in the gravitational direction G, and the second partition wall 402" formed in the gravitational direction G and disposed to be spaced apart from the first partition wall 402'. Based on FIG. 21, the crest centerline C1 and the trough centerline C2 of the crest 401a and the trough 401b disposed at the left side of the first partition wall 402' may be formed to be inclined downward toward the first partition wall 402'. The crest centerline C1 and the trough centerline C2 of the crest 401a and the trough 401b disposed at the right side of the second partition wall 402" may be formed to be inclined downward toward the second partition wall 402". The crest centerline C1 and the trough centerline C2 of the crest 401a and the trough 401b positioned between the first partition wall 402' and the second partition wall 402" may be formed to be inclined downward toward the second partition wall 402".

Figure 22:
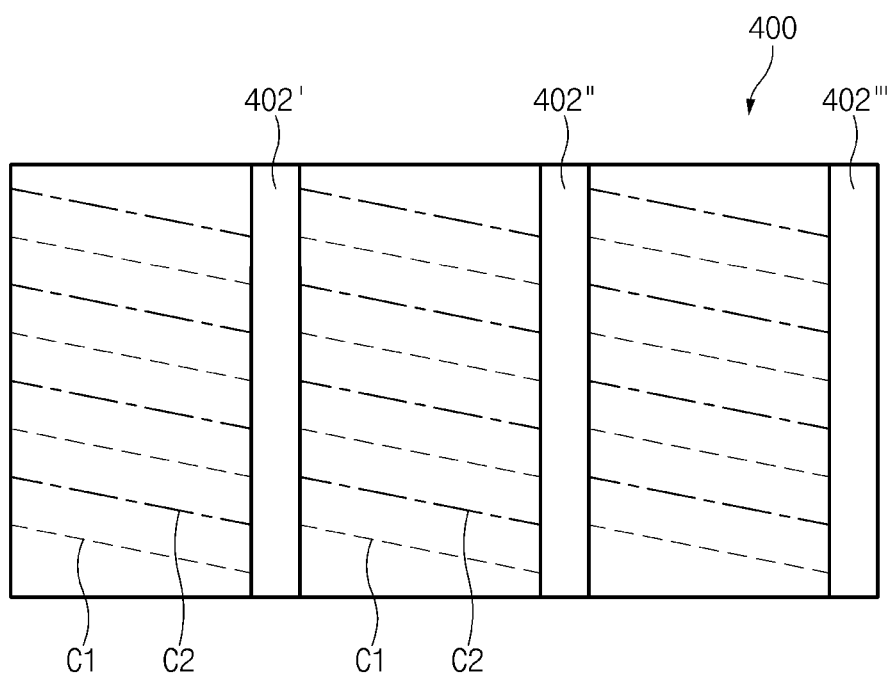

As yet another example, referring to FIG. 22, the porous structural unit 400 may include the first partition wall 402' formed in the gravitational direction G, the second partition wall 402" formed in the gravitational direction G and disposed to be spaced apart from the first partition wall 402', and a third partition wall 402'" formed in the gravitational direction G and disposed to be spaced apart from the second partition wall 402". Based on FIG. 22, the crest centerline C1 and the trough centerline C2 of the crest 401a and the trough 401b disposed at the left side of the first partition wall 402' may be formed to be inclined downward toward the first partition wall 402'. The crest centerline C1 and the trough centerline C2 of the crest 401a and the trough 401b disposed at the right side of the second partition wall 402" may be formed to be inclined downward toward the third partition wall 402'". The crest centerline C1 and the trough centerline C2 of the crest 401a and the trough 401b positioned between the first partition wall 402' and the second partition wall 402" may be formed to be inclined downward toward the second partition wall 402".

Figure 23:
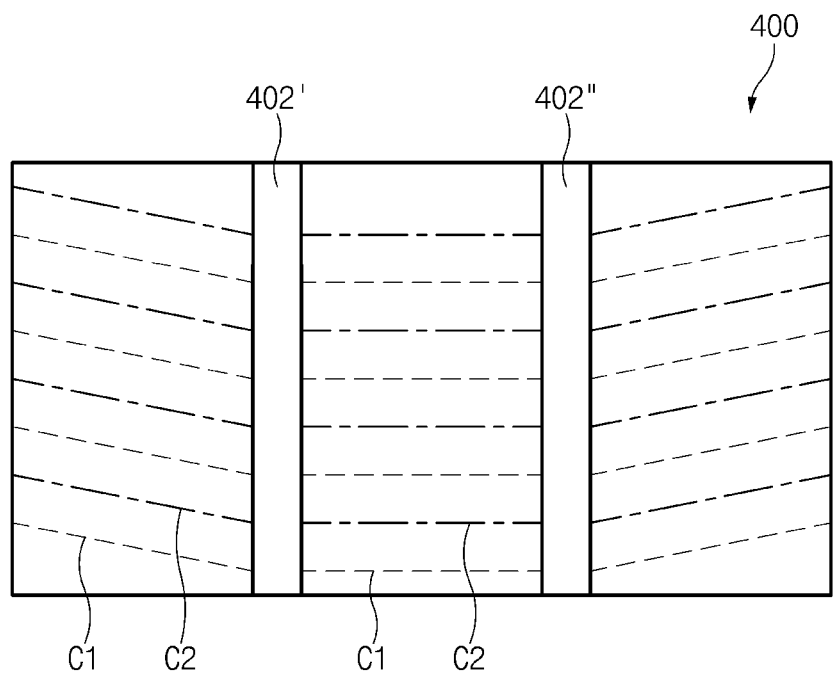

As still yet another example, referring to FIG. 23, the porous structural unit 400 may include the first partition wall 402' formed in the gravitational direction G, and the second partition wall 402" formed in the gravitational direction G and disposed to be spaced apart from the first partition wall 402'. Based on FIG. 23, the crest centerline C1 and the trough centerline C2 of the crest 401a and the trough 401b disposed at the left side of the first partition wall 402' may be formed to be inclined downward toward the first partition wall 402'. The crest centerline C1 and the trough centerline C2 of the crest 401a and the trough 401b disposed at the right side of the second partition wall 402" may be formed to be inclined downward toward the second partition wall 402". The crest centerline C1 and the trough centerline C2 of the crest 401a and the trough 401b positioned between the first partition wall 402' and the second partition wall 402" may be formed to be parallel to the horizontal line.

Further, in the exemplary embodiment of the present disclosure described and illustrated above, the example in which the porous structural unit 400 integrally includes the partition wall 402 is described. However, according to another exemplary embodiment of the present disclosure, the partition wall and the porous structural unit may be manufactured separately, and then the partition wall may be coupled to the porous structural unit.

While the present disclosure has been described above with reference to the exemplary embodiments, it may be understood by those skilled in the art that the present disclosure may be variously modified and changed without departing from the spirit and scope of the present disclosure disclosed in the claims.

What is claimed is:

1. A fuel cell stack, comprising:
a reaction layer having a membrane electrode assembly (MEA);
an anode separator having a gas channel formed at a first side facing the reaction layer and through which a first reactant gas flows, and a cooling channel formed at a second side and through which a coolant flows, wherein the anode separator abuts the reaction layer;
a flat cathode separator abutting the anode separator so that a first side of the flat cathode separator covers, in a flat manner, the cooling channel; and
a porous structural unit having a partition wall protruding from a second side of the flat cathode separator and having a flow path for a second reactant gas.

2. The fuel cell stack of claim 1, wherein the porous structural unit includes:
a first porous member disposed at the first side of the flat cathode separator; and
a second porous member disposed at the second side of the flat cathode separator and configured to form the partition wall in cooperation with the first porous member.

3. The fuel cell stack of claim 2, wherein:
the first porous member includes a first support portion supported at the second side of the flat cathode separator, and a first cantilever slab bent at an end of the first support portion,
the second porous member includes a second support portion supported at the second side of the flat cathode separator, and a second cantilever slab bent at an end of the second support portion, and
the partition wall is formed by connecting an end of the first cantilever slab and an end of the second cantilever slab.

4. The fuel cell stack of claim 3, wherein the end of the first cantilever slab and the end of the second cantilever slab are connected by welding.

5. The fuel cell stack of claim 3, wherein an inlet of the flat cathode separator is positioned at a lower side thereof and an outlet of the flat cathode separator is positioned at an upper side thereof in a gravitational direction, and the partition wall is disposed in the gravitational direction.

6. The fuel cell stack of claim 5, wherein a first aperture is formed in any one or both of the first support portion and the second support portion.

7. The fuel cell stack of claim 6, wherein a first rib extending toward an internal space of the partition wall is formed on an inner wall surface of the first aperture.

8. The fuel cell stack of claim 7, wherein the first rib is formed by partially cutting and bending a part of the first support portion or the second support portion.

9. The fuel cell stack of claim 5, wherein a second aperture is formed in an upper surface of the partition wall which is formed by the first cantilever slab and the second cantilever slab and abuts the reaction layer.

10. The fuel cell stack of claim 9, wherein a second rib extending toward an internal space of the partition wall is formed on an inner wall surface of the second aperture.

11. The fuel cell stack of claim 10, wherein the first rib is formed by partially cutting and bending a part of any one or both of the first cantilever slab and the second cantilever slab, and the second rib is formed by partially cutting and bending a part of the upper surface of the partition wall.

12. The fuel cell stack of claim 5, wherein the porous structural unit includes crests and troughs continuously connected to form a waveform, and a crest centerline set in a longitudinal direction of the crest and a trough centerline set in a longitudinal direction of the trough are formed to be inclined with respect to a horizontal line perpendicular to the partition wall.

13. The fuel cell stack of claim 12, wherein the crest centerline and the trough centerline are formed to be entirely or partially inclined downward toward the partition wall with respect to the horizontal line.

14. The fuel cell stack of claim 12, wherein each of the crest centerline and the trough centerline is defined to have any one of a straight shape, a curved shape, and a combination of a straight shape and a curved shape.

15. The fuel cell stack of claim 5, wherein the partition wall includes:
a first partition wall formed in the gravitational direction; and
a second partition wall formed in the gravitational direction and spaced apart from the first partition wall.

16. The fuel cell stack of claim 1, wherein the porous structural unit includes:
a first porous member disposed at the second side of the flat cathode separator and configured to independently form the partition wall; and
a second porous member connected to the first porous member.

17. The fuel cell stack of claim 16, wherein the first porous member includes:
a first support portion supported at the second side of the flat cathode separator;
a second support portion supported at the second side of the flat cathode separator and spaced apart from the first support portion; and
a slab configured to connect an end of the first support portion and an end of the second support portion, and
wherein the partition wall is formed by the first support portion, the second support portion, and the slab.

* * * * *